(12) United States Patent
Lee

(10) Patent No.: US 12,420,540 B2
(45) Date of Patent: Sep. 23, 2025

(54) METHOD AND SYSTEM FOR MANUFACTURING LIGHTWEIGHT COMPOUNDED UNI-DIRECTIONAL CLOTH

(71) Applicant: QUANN CHENG INTERNATIONAL CO., LTD., Pingtung (TW)

(72) Inventor: Hsing-Hsun Lee, Kaohsiung (TW)

(73) Assignee: QUANN CHENG INTERNATIONAL CO., LTD., Pingtung (TW)

( * ) Notice: Subject to any disclaimer, the term of this patent is extended or adjusted under 35 U.S.C. 154(b) by 125 days.

(21) Appl. No.: 18/469,565

(22) Filed: Sep. 19, 2023

(65) Prior Publication Data

US 2024/0308199 A1    Sep. 19, 2024

(30) Foreign Application Priority Data

Mar. 17, 2023  (TW) .................... 112109948

(51) Int. Cl.
| | |
|---|---|
| *B32B 38/10* | (2006.01) |
| *B32B 5/02* | (2006.01) |
| *B32B 5/12* | (2006.01) |
| *B32B 5/26* | (2006.01) |
| *B32B 37/00* | (2006.01) |
| *B32B 37/06* | (2006.01) |
| *B32B 37/08* | (2006.01) |
| *B32B 37/10* | (2006.01) |
| *B32B 37/12* | (2006.01) |
| *B32B 41/00* | (2006.01) |

(52) U.S. Cl.
CPC ............. *B32B 38/10* (2013.01); *B32B 5/02* (2013.01); *B32B 5/12* (2013.01); *B32B 5/26* (2013.01); *B32B 37/0053* (2013.01); *B32B 37/06* (2013.01); *B32B 37/08* (2013.01); *B32B 37/1054* (2013.01); *B32B 37/12* (2013.01); *B32B 41/00* (2013.01); *B32B 2305/18* (2013.01); *B32B 2309/70* (2013.01); *B32B 2571/02* (2013.01)

(58) Field of Classification Search
CPC . B32B 2571/02; B32B 41/00; B32B 2305/18; B32B 2309/70; B32B 37/12; B32B 37/1054; B32B 37/08; B32B 37/06; B32B 37/0053; B32B 5/26; B32B 5/12; B32B 5/02; B32B 38/10
See application file for complete search history.

(56) References Cited

U.S. PATENT DOCUMENTS

| | | | | |
|---|---|---|---|---|
| 7,923,094 | B1 * | 4/2011 | Harding | B29C 66/91411 156/304.6 |
| 2014/0335750 | A1 * | 11/2014 | Adams | B32B 27/322 442/50 |
| 2016/0144597 | A1 * | 5/2016 | Yin | B32B 7/04 156/166 |

* cited by examiner

*Primary Examiner* — Vishal I Patel
(74) *Attorney, Agent, or Firm* — Leong C. Lei

(57) ABSTRACT

A method for manufacturing a lightweight compounded uni-directional cloth is presented, includes: providing two uni-directional cloths, and each of the uni-directional cloths has a yarn layer and an adhesive film layer; hot pressing the two uni-directional cloths with the yarn layers facing each other to form a semi-finished product, the yarn directions of the two yarn layers being not parallel; and heating the semi-finished product, and peeling off the adhesive film layer on one side of the semi-finished product to obtain a lightweight compounded uni-directional cloth. A system for implementing the above-mentioned method is also presented.

11 Claims, 4 Drawing Sheets

METHOD AND SYSTEM FOR MANUFACTURING LIGHTWEIGHT COMPOUNDED UNI-DIRECTIONAL CLOTH

CROSS-REFERENCE TO RELATED APPLICATION

This application claims the benefit of Taiwan Patent Application No. 112109948, filed on 17 Mar. 2023, which is hereby incorporated by reference for all purposes as if fully set forth herein.

BACKGROUND

Technical Field

The present disclosure mainly relates to a method and system for manufacturing a uni-directional cloth, in particular to a method and system for manufacturing a lightweight compounded uni-directional cloth.

Related Art

A uni-directional cloth, also called a UD cloth, is a nonwoven fabric formed by bonding; and common materials include high-performance fibers such as carbon fibers, aramid fibers or ultra high molecular weight polyethylene fibers (UHMWPEF for short), have excellent performances such as impact resistance, high toughness to achieve cutting resistance, good damping effect, abrasion resistance and low density leading to light weight, and are widely applied to the safety protection fields such as bullet proofing, stab resistance or explosion proofing at present.

The uni-directional cloth manufactured by a general process has a yarn layer and an adhesive film layer, but due to the effect of the yarn direction of the yarn layer extending only along the warp direction, a single uni-directional cloth has the disadvantage of insufficient weft-direction strength; and therefore, in almost all the production of the product applied to the safety protection field with high strength requirement, a plurality of layers of uni-directional cloths is laid up, overlapped and compounded to strengthen the strength of the product in various directions. However, the product obtained by laying up, overlapping and compounding a plurality of uni-directional cloths requires a small amount of adhesive, but simply laying up, overlapping and compounding a plurality of uni-directional cloths results in an excessive number of adhesive film layers on the product, and it is difficult to reduce the weight of the whole product due to the excessive amount of adhesive.

In view of the above, it is necessary to provide a method for manufacturing a lightweight compounded uni-directional cloth to solve the above problems.

SUMMARY

The present disclosure aims to provide a method for manufacturing a lightweight compounded uni-directional cloth, allowing to remove part of adhesive film layers in a compounding process to reduce the weight of a product.

The present disclosure also aims to provide a method for manufacturing a lightweight compounded uni-directional cloth, allowing to further enhance the strength and toughness of a product.

The present disclosure further aims to provide a system for manufacturing a lightweight compounded uni-directional cloth, allowing to implement the method for manufacturing a lightweight compounded uni-directional cloth.

To achieve the above objects, the present disclosure provides a method for manufacturing a lightweight compounded uni-directional cloth, including: providing two uni-directional cloths, each of the uni-directional cloths has a yarn layer and an adhesive film layer; hot pressing the two uni-directional cloths with the yarn layers facing each other to form a semi-finished product, the yarn directions of the two yarn layers being not parallel; and heating the semi-finished product, and peeling off the adhesive film layer on one side of the semi-finished product to obtain a lightweight compounded uni-directional cloth.

In some examples, after being heated, the semi-finished product may be conveyed through a stripping roller, so that the adhesive film layer on one side of the semi-finished product is peeled off by the stripping roller.

In some examples, heating may be carried out from one side of the semi-finished product, and the stripping roller may peel off an adhesive film layer located on the other side of the semi-finished product.

In some examples, the semi-finished product may be conveyed through a space between a hot glue roller and a guide roller, so that one side of the semi-finished product is heated by the hot glue roller.

In some examples, the yarn directions of two yarn layers of the semi-finished products may be orthogonal.

In some examples, the method for manufacturing a lightweight compounded uni-directional cloth may further: include overlapping and conveying a plurality of lightweight compounded uni-directional cloths through a heating area to heat and press the plurality of lightweight compounded uni-directional cloths in the heating area, and then conveying the lightweight compounded uni-directional cloths through a cooling area so as to discharge a pressed product after cooling.

In some examples, after the plurality of lightweight compounded uni-directional cloths is heated and pressed, yarn layers of the plurality of lightweight compounded uni-directional cloths may be fused to form a whole body.

In some examples, in the heating area, the plurality of overlapped lightweight compounded uni-directional cloths may be clamped by two heat-resistant conveying belts, and the two heat-resistant conveying belts and the plurality of lightweight compounded uni-directional cloths may be tensioned and conveyed through a space between a plurality of heating rollers in a staggered manner, so that the plurality of lightweight compounded uni-directional cloths is pressed and pulled in a conveying process.

In some examples, the operating temperatures of the plurality of heating rollers may decrease from a feeding end to the cooling area.

In some examples, after leaving away from the heating area, the plurality of pressed lightweight compounded uni-directional cloths may be tensioned and conveyed through a space between a plurality of temperature-control rollers located in the cooling area in a staggered manner, and the operating temperatures of the plurality of temperature-control rollers may decrease from the heating area to a discharging end.

The present disclosure further provides a system for manufacturing a lightweight compounded uni-directional cloth, including: a uni-directional cloth compounding machine, configured to hot press two uni-directional cloths into a semi-finished product, each of the uni-directional cloths having a yarn layer and an adhesive film layer, the yarn layers of the two uni-directional cloths facing each other, and the yarn directions of the two yarn layers being not parallel; an adhesive peeling module, adjacent to the uni-directional cloth compounding machine, the adhesive peeling module having a hot glue roller located on the side opposite to a guide roller and a stripping roller, when the semi-finished product is conveyed through a space between the hot glue roller and the guide roller, the hot glue roller heats one side of the semi-finished product, and when the semi-finished product is conveyed through the stripping roller, the stripping roller peels off the adhesive film layer located on the other side of the semi-finished product to form a lightweight compounded uni-directional cloth; and a micro-controller, electrically connected to the adhesive peeling module, and configured to control the operating temperature of the hot glue roller.

In some examples, the uni-directional cloth compounding machine may have a first feeding end, a second feeding end and a discharging end, the first feeding end is configured to feed one of the two uni-directional cloths, the second feeding end is configured to feed the other uni-directional cloth, the two uni-directional cloths may be hot pressed in the uni-directional cloth compounding machine to form the semi-finished product, and the semi-finished product is discharged from the discharging end.

In some examples, the first feeding end and the second feeding end may be respectively located on two orthogonal adjacent sides of the uni-directional cloth compounding machine, and the discharging end may be opposite to the first feeding end.

In some examples, the yarn direction of the yarn layer of the uni-directional cloth fed from the first feeding end may be parallel to the direction, extending to the discharging end, of the first feeding end; and the yarn direction of the yarn layer of the uni-directional cloth fed from the second feeding end may be orthogonal to the yarn direction of the yarn layer of the above-mentioned uni-directional cloth.

In some examples, the surface of the stripping roller may be made of a rubber material.

In some examples, the system for manufacturing a lightweight compounded uni-directional cloth may further include an overlapping and compounding machine adjacent to the adhesive peeling module, the overlapping and compounding machine may have a heating area closer to a feeding end, and a cooling area closer to a discharging end, a conveying module is configured to sequentially convey a plurality of overlapped lightweight compounded uni-directional cloths through the heating area and the cooling area, the plurality of lightweight compounded uni-directional cloths may be heated and pressed in the heating area, and may be cooled in the cooling area to discharge a pressed product, and the micro-controller may be electrically connected to the overlapping and compounding machine, and is configured to control the operating temperature of the heating area.

In some examples, after the plurality of lightweight compounded uni-directional cloths is heated and pressed in the heating area, the yarn layers of the lightweight compounded uni-directional cloths may be fused to form a whole body.

In some examples, in the heating area, the plurality of overlapped lightweight compounded uni-directional cloths may be clamped by two heat-resistant conveying belts, and the two heat-resistant conveying belts and the plurality of lightweight compounded uni-directional cloths may be tensioned and conveyed through a space between a plurality of heating rollers in a staggered manner, so that the plurality of lightweight compounded uni-directional cloths is pressed and pulled in a conveying process.

In some examples, the heat-resistant conveying belts may be made of a polytetrafluoroethylene material.

In some examples, the micro-controller may control the operating temperatures of the plurality of heating rollers to decrease from a feeding end to the cooling area.

In some examples, after leaving away from the heating area, the plurality of pressed lightweight compounded uni-directional cloths may be tensioned and conveyed through a space between the plurality of temperature-control rollers located in the cooling area in a staggered manner, and the micro-controller may control the operating temperatures of the plurality of temperature-control rollers to decrease from the heating area to the discharging end.

In some examples, the overlapping and compounding machine may have two pressing and feeding modules arranged oppositely, each of the two pressing and feeding modules may have a heat-resistant belt surrounding a plurality of rollers, a conveying channel may be formed between the two heat-resistant belts, and the rollers, closest to the conveying channel, in the two pressing and feeding modules may have an adjustable distance.

In some examples, the overlapping and compounding machine may have a plurality of heaters in the heating area, the plurality of heaters may be respectively located on the inner sides of the two heat-resistant belts, and the micro-controller may control the operating temperatures of the plurality of heaters.

In some examples, the overlapping and compounding machine may have a plurality of coolers in the cooling area, the plurality of coolers may be respectively located on the inner sides of the two heat-resistant belts, and the micro-controller may control the operating temperatures of part or all of the plurality of coolers.

In some examples, the system for manufacturing a lightweight compounded uni-directional cloth may further include a rolling module adjacent to the overlapping and compounding machine, and is configured to roll the pressed product discharged from the discharging end of the overlapping and compounding machine.

The method and system for manufacturing a lightweight compounded uni-directional cloth of the present disclosure have the following characteristics: part of the adhesive film layers may be removed in the compounding process, so that the weight of the product is greatly reduced, and the practicability and the competitiveness of the product are improved owing to the advantages of light weight and high strength of the product. Besides, the plurality of lightweight compounded uni-directional cloths may be pressed and pulled in a conveying process in the present disclosure, and thus, the subsequently manufactured pressed product may have further enhanced toughness and strength. In addition, the system has simple devices and has the effects that device cost and maintenance cost are reduced, assembly and production efficiency is improved, and the like.

DETAILED DESCRIPTION

The examples of the present disclosure are described in detail below with reference to the accompanying drawings, the accompanying drawings are schematically simplified mainly to illustrate the basic structure of the present disclosure, therefore only the elements relevant to the present disclosure are labeled in the accompanying drawings, and the elements shown are not drawn with numbers, shapes, size ratios and the like in the implementation, and the specification and size in actual implementation are actually a selective design, and the layout of the elements may be more complicated.

The following description of the examples refers to the accompanying drawings for illustrating the specific examples where the present disclosure may be practiced. The directional terms used in the present disclosure, such as "up", "down", "front", and "back", refer to the directions of the accompanying drawings. Accordingly, the directional terms are used for purposes of illustration and understanding, and are not intended to be limiting of this application. In addition, in the description, unless explicitly described to the contrary, the word "comprise" will be understood to mean that the recited elements are included, without the exclusion of any other elements.

Figure 1:
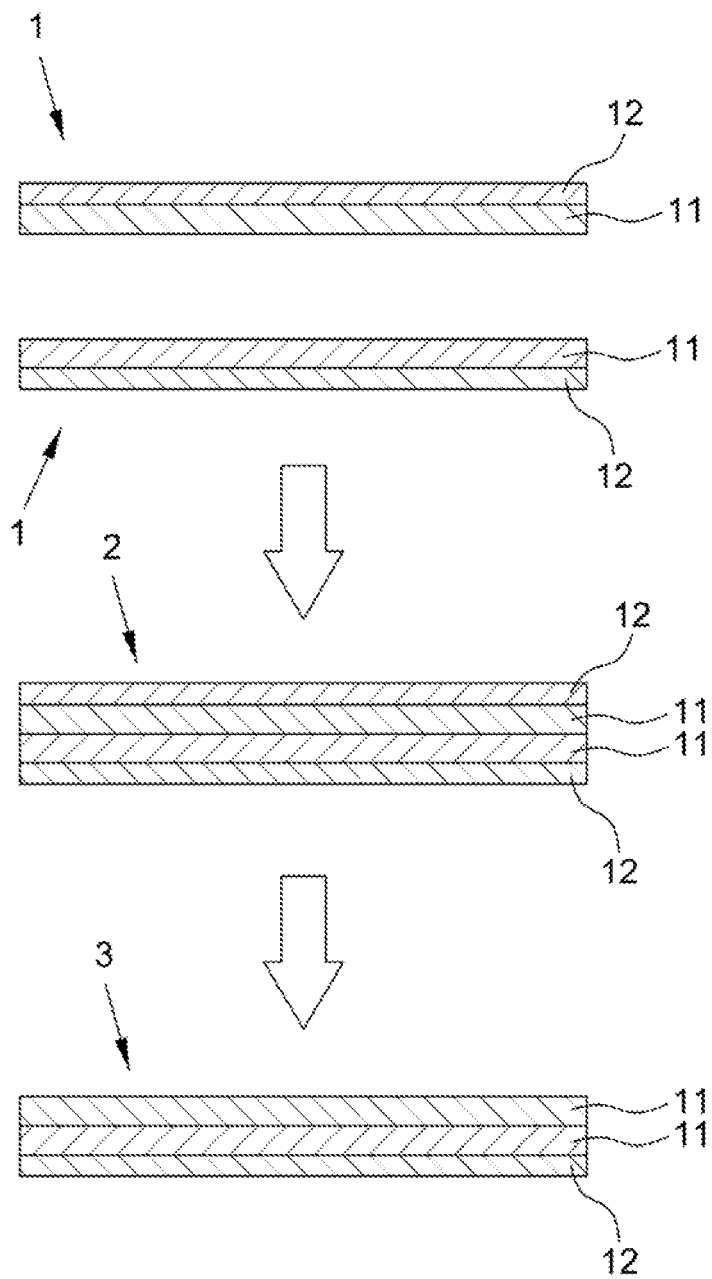
FIG. 1 is a schematic diagram of steps of a method according to the present disclosure.

Referring to FIG. 1, the present disclosure provides a method for manufacturing a lightweight compounded uni-directional cloth, including: providing two uni-directional cloths 1, each of the uni-directional cloths 1 having a yarn layer 11 and an adhesive film layer 12; hot pressing the two uni-directional cloths 1 with the yarn layers 11 facing each other to form a semi-finished product 2, the yarn directions of the two yarn layers 11 being not parallel; and heating the semi-finished product 2, and peeling off the adhesive film layer 12 on one side of the semi-finished product 2 to obtain a lightweight compounded uni-directional cloth 3. Therefore, in the present disclosure, after the two uni-directional cloths 1 are compounded, one of the original two adhesive film layers 12 is removed, namely about half of the adhesive is removed, so that the weight of the lightweight compounded uni-directional cloth 3 product is greatly reduced.

After the semi-finished product 2 is heated, the semi-finished product 2 is conveyed through a roller, the adhesive film layer 12 on one side of the semi-finished product 2 is peeled off by friction resistance between the roller and the semi-finished product 2 to form the lightweight compounded uni-directional cloth 3, the process is easily continuously carried out, and thus, the production efficiency is improved.

The semi-finished product 2 can be heated, for example, from one side of the semi-finished product 2 to increase the adhesive force of the adhesive film layer 12 on the side, and the adhesive film layer 12 located on the other side (non-heated side) of the semi-finished product 2 is peeled off by the roller. For example, when the semi-finished product 2 is conveyed by using a plurality of rollers cooperatively, the operating temperatures of at least one of the rollers can be increased before the semi-finished product 2 passes through the roller for peeling off the adhesive film layer 12, so that the semi-finished product 2 may be heated first and then the adhesive film layer 12 on one side can be peeled off in the conveying process.

Figure 2:
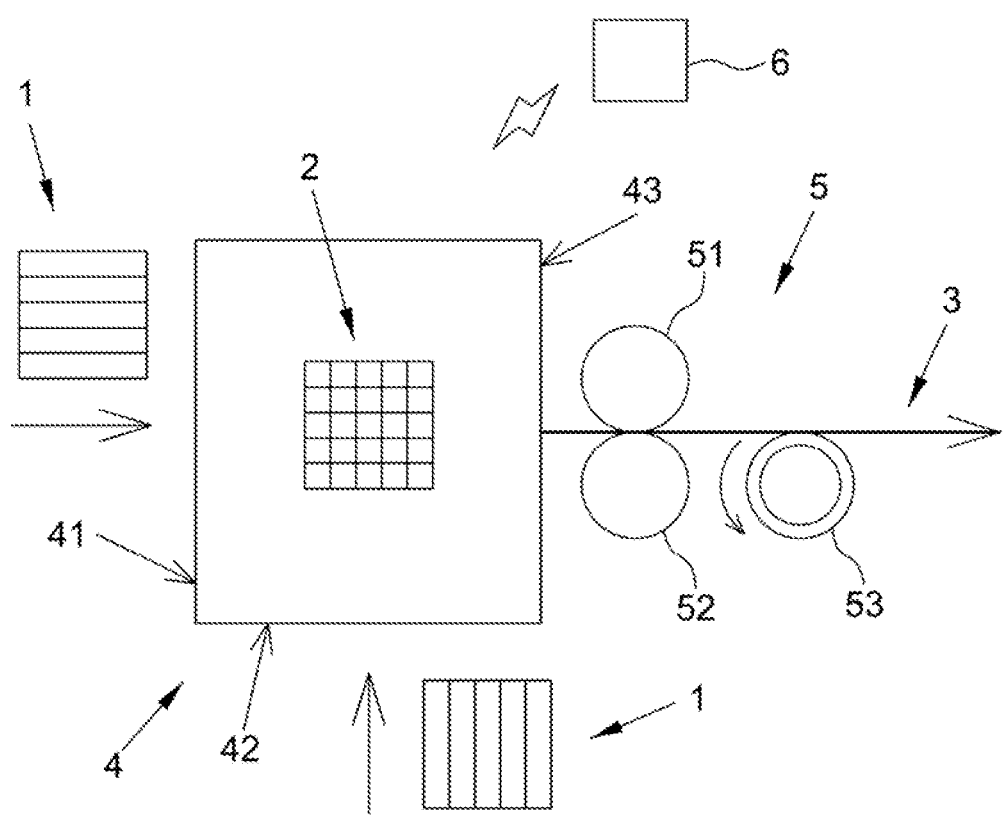
FIG. 2 is a schematic diagram of devices of a system according to the present disclosure.

Referring to FIG. 2, a first example of a system for manufacturing a lightweight compounded uni-directional cloth capable of implementing the above method is shown, the system for manufacturing a lightweight compounded uni-directional cloth includes: a uni-directional cloth compounding machine 4, an adhesive peeling module 5 and a micro-controller 6, the uni-directional cloth compounding machine 4 and the adhesive peeling module 5 being arranged adjacently, and the micro-controller 6 being electrically connected to the adhesive peeling module 5.

Referring to FIG. 1 and FIG. 2, the uni-directional cloth compounding machine 4 is configured to hot press the two uni-directional cloths 1 into the semi-finished product 2. For example, the uni-directional cloth compounding machine 4 of this example may have a first feeding end 41, a second feeding end 42 and a discharging end 43, one of the uni-directional cloths 1 may be fed from the first feeding end 41, the other uni-directional cloth 1 may be fed from the second feeding end 42, the two uni-directional cloths 1 may be hot pressed in the uni-directional cloth compounding machine 4 to form the semi-finished product 2, and the semi-finished product 2 is discharged from the discharging end 43.

In the present disclosure, the relative positions of the first feeding end 41, the second feeding end 42 and the discharging end 43 are not limited, can be selected by one skilled in the art according to the process requirement, and therefore are not limited to the types disclosed in this example. Since this example is described by taking the case that the yarn directions of the two yarn layers 11 of the semi-finished product 2 are orthogonal, in the uni-directional cloth compounding machine 4 of this example, the first feeding end 41 and the second feeding end 42 may be selectively located on two adjacent sides of the orthogonal direction respectively, and the discharging end 43 may be opposite to the first feeding end 41, so as to improve the smoothness of the continuous production process. In addition, the yarn direction of the yarn layer 11 of the uni-directional cloth 1 fed from the first feeding end 41 may be parallel to the direction, extending to the discharging end 43, of the first feeding end 41; and the yarn direction of the yarn layer 11 of the uni-directional cloth 1 fed from the second feeding end 42 may be orthogonal to the yarn direction of the yarn layer 11 of the above-mentioned uni-directional cloth 1.

The adhesive peeling module 5 is adjacent to the uni-directional cloth compounding machine 4, and may be configured to receive the semi-finished product 2 from the discharging end 43 of the uni-directional cloth compounding machine 4, the semi-finished product 2 is heated, and the adhesive film layer 12 on one side of the semi-finished product 2 is peeled off. In this example, the adhesive peeling module 5 has a hot glue roller 51 located on the side opposite to a guide roller 52 and a stripping roller 53, and the stripping roller 53 is located behind the guide direction of the guide roller 52. The surface of the stripping roller 53 may be made of a rubber material so as to have high frictional resistance.

The micro-controller 6 is electrically connected to the adhesive peeling module 5, the micro-controller 6 may control the operating temperature of the hot glue roller 51, so that the operating temperature of the hot glue roller 51 can be maintained at a numerical value higher than the numerical value allowing the adhesive film layer 12 to be in a semi-molten state. Thus, the semi-finished product 2 from the uni-directional cloth compounding machine 4 may be conveyed through a space between the hot glue roller 51 and the guide roller 52 first, and the hot glue roller 51 heats one side of the semi-finished product 2, so that the adhesive film layer 12 located on one side of the semi-finished product 2 may be in a self-molten state; and when the semi-finished product 2 is conveyed through the stripping roller 53, the adhesive film layer 12 located on the other side (non-heated side) of the semi-finished product 2 is peeled off by the aid of high frictional resistance between the stripping roller 53 and the semi-finished product 2, and thus, the lightweight compounded uni-directional cloth 3 is formed.

Figure 3:
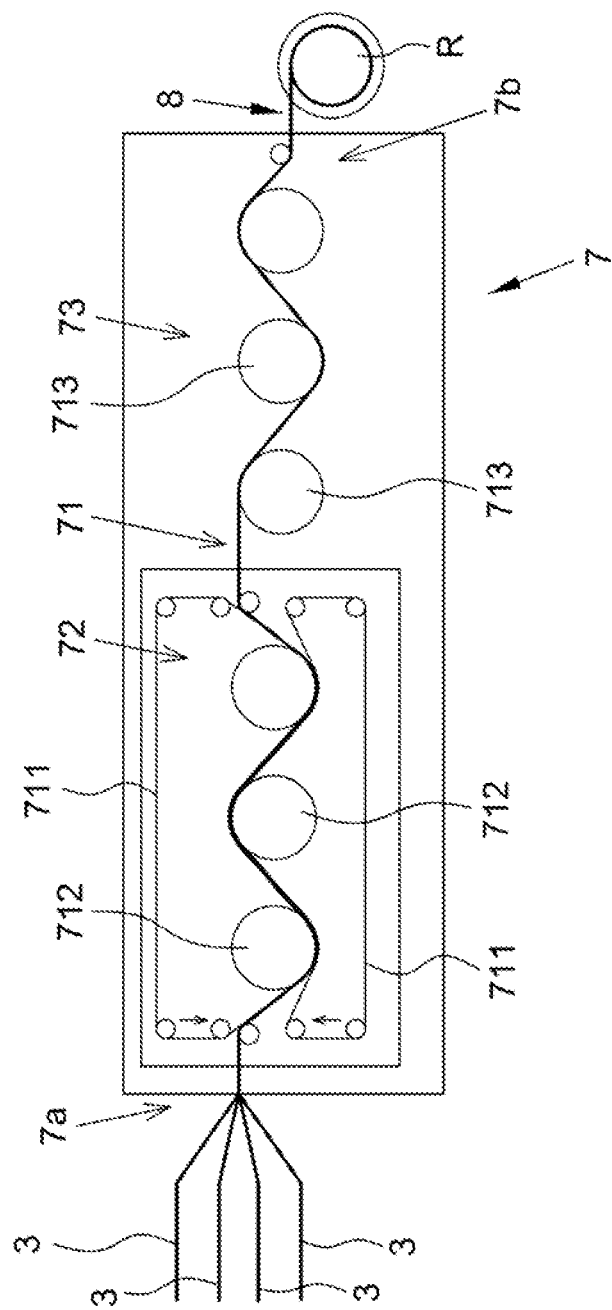
FIG. 3 is a schematic diagram of devices of a system of a first example with an overlapping and compounding machine according to the present disclosure.

Referring to FIG. 2 and FIG. 3, the system for manufacturing a lightweight compounded uni-directional cloth of this example may further include an overlapping and compounding machine 7, the overlapping and compounding machine 7 is adjacent to the adhesive peeling module 5, and may be configured to receive the lightweight compounded uni-directional cloths 3 of the adhesive peeling module 5, the plurality of lightweight compounded uni-directional cloths 3 may be overlapped, and are conveyed through a heating area 72 via a conveying module 71, the plurality of lightweight compounded uni-directional cloths 3 are heated and pressed in the heating area 72, and are conveyed through a cooling area 73 via the conveying module 71, and then a pressed product 8 is discharged after cooling. The micro-controller 6 may be electrically connected to the overlapping and compounding machine 7, so as to control the operating temperature of the heating area 72.

In detail, the overlapping and compounding machine 7 of this example may have a feeding end 7a and a discharging end 7b, the conveying module 71 may convey the plurality of lightweight compounded uni-directional cloths 3 from the feeding end 7a to the discharging end 7b, the heating area 72 is closer to the feeding end 7a, the cooling area 73 is closer to the discharging end 7b, and thus, the conveying module 71 may sequentially convey the plurality of overlapped lightweight compounded uni-directional cloths 3 through the heating area 72 and the cooling area 73. In the heating area 72, the plurality of overlapped lightweight compounded uni-directional cloths 3 may be clamped by the two heat-resistant conveying belts 711, and the two heat-resistant conveying belts 711 and the plurality of lightweight compounded uni-directional cloths 3 may be synchronously tensioned and conveyed through a space between the plurality of heating rollers 712 in a staggered manner; that is, the plurality of lightweight compounded uni-directional cloths 3 may surround the plurality of heating rollers 712 in an S-shaped manner, thus, the plurality of lightweight compounded uni-directional cloths 3 are pressed and pulled in the conveying process, and then the pressed product 8 manufactured subsequently may have higher toughness and strength.

The heat-resistant conveying belts 711 may be selectively made of a polytetrafluoroethylene (PTFE) material, and the two heat-resistant conveying belts 711 may respectively move circularly in the heating area 72. The micro-controller 6 may control the operating temperatures of the plurality of heating rollers 712, so that the operating temperatures of the heating rollers 712 can be maintained at a numerical value higher than the numerical value allowing the yarn layer 11 (as shown in FIG. 1) to be in a semi-molten state, after the plurality of lightweight compounded uni-directional cloths 3 are heated and pressed, at least part of the yarn layers 11 may be fused into a whole body, and all the yarn layers 11 may be fused into a whole body preferably.

In another aspect, after leaving from the heating area 72, the plurality of pressed lightweight compounded uni-directional cloths 3 may be tensioned and conveyed through a space between a plurality of temperature-control rollers 713 in the cooling area 73 in a staggered manner; and the micro-controller 6 may also control the operating temperatures of the plurality of temperature-control rollers 713, so that the operating temperature of each of the temperature-control rollers 713 can be maintained at a numerical value lower than the numerical value allowing the yarn layer 11 to be in a semi-molten state, and then the plurality of yarn layers 11 fused into a whole body is cooled and shaped in a process of conveying the lightweight compounded uni-directional cloths to the discharging end 7b. Further, the operating temperatures of the plurality of heating rollers 712 may decrease from the feeding end 7a to the cooling area 73, the operating temperatures of the plurality of temperature-control rollers 713 may decrease from the heating area 72 to the discharging end 7b, and thus, temperature change of the pressed product 8 in the process is more gentle and stable, so as to improve the quality of the pressed product 8. The pressed product 8 discharged from the discharging end 7b of the overlapping and compounding machine 7 may be rolled by a rolling module R.

Figure 4:
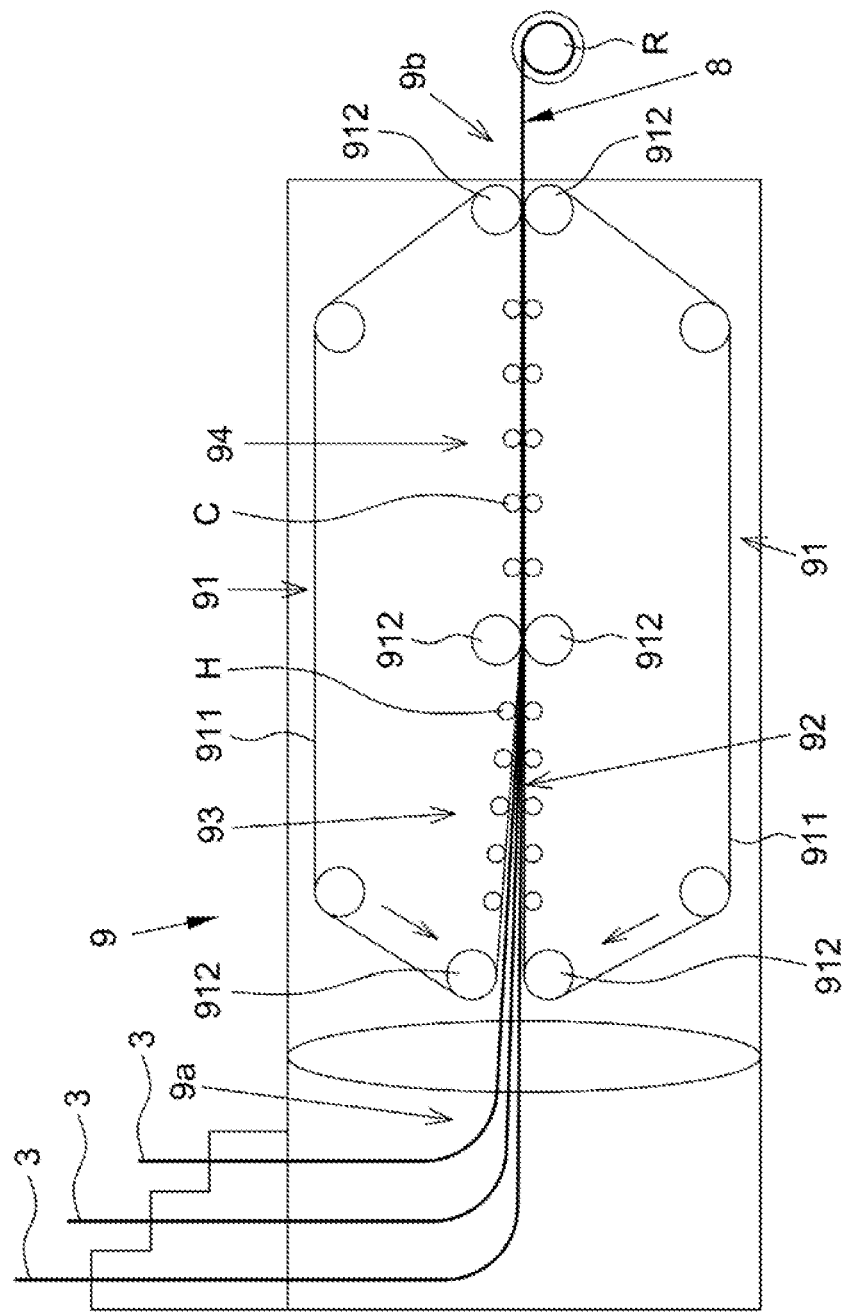
FIG. 4 is a schematic diagram of devices of a system of a second example with an overlapping and compounding machine according to the present disclosure.

Referring to FIG. 4, a second example of the system for manufacturing a lightweight compounded uni-directional cloth capable of implementing the method is shown, and in this example, an overlapping and compounding machine 9 different from the first example is utilized. In this example, the overlapping and compounding machine 9 may have a feeding end 9a and a discharging end 9b, two pressing and feeding modules 91 are oppositely arranged in the up-down direction, each of the two pressing and feeding modules 91 has a heat-resistant belt 911 surrounding a plurality of rollers 912, a conveying channel 92 is formed between the two heat-resistant belts 911, and the relative distance between the rollers 912, closest to the conveying channel 92, in the two pressing and feeding modules 91 may be adjusted to adjust pressure applied to articles in the conveying channel 92 by the two heat-resistant belts 911. In addition, the overlapping and compounding machine 9 may have a heating area 93 and a cooling area 94, the heating area 93 is closer to the feeding end 9a, and the cooling area 94 is closer to the discharging end 9b. In this example, a plurality of heaters H may be arranged in the heating area 93, the plurality of heaters H may be located on the inner sides of the two heat-resistant belts 911 respectively, and thus, the parts, passing through the heating area 93, of the two heat-resistant belts 911 may be heated by the plurality of heaters H; and moreover, a plurality of coolers C may be arranged in the cooling area 94, and the plurality of coolers C may be located on the inner sides of the two heat-resistant belts 911 respectively, so that the parts, passing through the cooling area 94, of the two heat-resistant belts 911 may be cooled by the plurality of coolers C.

Referring to FIG. 2 and FIG. 4, hereby, the plurality of overlapped lightweight compounded uni-directional cloths 3 from the adhesive peeling module 5 may be fed from the feeding end 9a of the overlapping and compounding machine 9 of this example, the heat-resistant belts 911 of the two pressing and feeding modules 91 jointly clamp and carry the plurality of lightweight compounded uni-directional cloths 3 to enter the conveying channel 92, and the plurality of lightweight compounded uni-directional cloths 3 is conveyed to the discharging end 9b linearly. When passing through the heating area 93, the plurality of lightweight compounded uni-directional cloths 3 may be heated and pressed by the two pressing and feeding modules 91; and when passing through the cooling area 94, the plurality of pressed lightweight compounded uni-directional cloths 3 may be cooled gradually by the two cooled heat-resistant belts 911, thus, a pressed product 8 is discharged from the discharging end 9b, and the pressed product 8 may also be rolled by the rolling module R.

The micro-controller 6 may be electrically connected to the overlapping and compounding machine 9 of this example, so as to control the operating temperature of the heating area 93; for example, the heaters H may be articles such as a temperature-controller roller or an air supply apparatus, and the operating temperatures of the plurality of heaters H may be controlled by the micro-controller 6. Similarly, the coolers C may also be articles such as rollers or air supply apparatuses. In some examples, the plurality of coolers C may not be temperature controllers; and in this example, part or all of the coolers C may be temperature controllers preferably, and may be electrically connected to the micro-controller 6, and the micro-controller 6 controls the operating temperatures of the plurality of coolers C.

It should be noted that the method for manufacturing a lightweight compounded uni-directional cloth of the present disclosure is not necessarily performed by the system for manufacturing a lightweight compounded uni-directional cloth of the first or second example disclosed above, and the method for manufacturing a lightweight compounded uni-directional cloth of the present disclosure can be performed by other types of apparatuses or systems.

As described above, according to the method and system for manufacturing a lightweight compounded uni-directional cloth of the present disclosure, part of the adhesive film layers may be removed in the compounding process, thus, the weight of the product is greatly reduced, and higher practicability and competitiveness are achieved due to the advantages of light weight and high strength when the lightweight compounded uni-directional cloth is applied to soft body armors, light bulletproof helmets, light bulletproof armor plates, stab/cut prevention clothing linings, special public anti-riot facilities and the like. Besides, the plurality of lightweight compounded uni-directional cloths may be pressed and pulled in a conveying process in the present disclosure, and thus, the subsequently manufactured pressed product may have further enhanced toughness and strength. In addition, the system has simple devices and has the effects that device cost and maintenance cost are reduced, assembly and production efficiency is improved, and the like.

The above-disclosed implementations are merely illustrative of the principles, features and effects of the present disclosure, and do not limit the scope of the present disclosure, and the above implementations can be modified and varied by those skilled in the art without departing from the spirit and scope of the present disclosure. Any equivalent changes and modifications made using the teachings of the present disclosure shall still be covered by the following claims.

What is claimed is:

1. A system for manufacturing a lightweight compounded uni-directional cloth, comprising:
   a uni-directional cloth compounding machine, configured to hot press two uni-directional cloths into a semi-finished product, wherein each of the uni-directional cloths has a yarn layer and an adhesive film layer, yarn layers of the two uni-directional cloths face each other, and yarn directions of the two yarn layers are not parallel;
   an adhesive peeling module, adjacent to the uni-directional cloth compounding machine, wherein the adhesive peeling module has a hot glue roller located on the side opposite to a guide roller and a stripping roller, when the semi-finished product is conveyed through a space between the hot glue roller and the guide roller, the hot glue roller heats one side of the semi-finished product, and when the semi-finished product is conveyed through the stripping roller, the stripping roller peels off the adhesive film layer located on the other side of the semi-finished product to form a lightweight compounded uni-directional cloth; and
   a micro-controller, electrically connected to the adhesive peeling module, and configured to control the operating temperature of the hot glue roller.

2. The system for manufacturing the lightweight compounded uni-directional cloth according to claim 1, wherein the uni-directional cloth compounding machine has a first feeding end, a second feeding end and a discharging end, the first feeding end is configured to feed one of the two uni-directional cloths, the second feeding end is configured to feed the other uni-directional cloth, the two uni-directional cloths are hot pressed in the uni-directional cloth compounding machine to form the semi-finished product, and the semi-finished product is discharged from the discharging end.

3. The system for manufacturing the lightweight compounded uni-directional cloth according to claim 2, wherein the first feeding end and the second feeding end are respectively located on two orthogonal adjacent sides of the uni-directional cloth compounding machine, and the discharging end is opposite to the first feeding end.

4. The system for manufacturing the lightweight compounded uni-directional cloth according to claim 3, wherein the yarn direction of the yarn layer of the uni-directional cloth fed from the first feeding end is parallel to the direction, extending to the discharging end, of the first feeding end; and the yarn direction of the yarn layer of the uni-directional cloth fed from the second feeding end is orthogonal to the yarn direction of the yarn layer of the above-mentioned uni-directional cloth.

5. The system for manufacturing the lightweight compounded uni-directional cloth according to claim 1, wherein the surface of the stripping roller is made of a rubber material.

6. The system for manufacturing the lightweight compounded uni-directional cloth according to claim 1, further comprising an overlapping and compounding machine adjacent to the adhesive peeling module, wherein the overlapping and compounding machine has a heating area closer to a feeding end, and a cooling area closer to a discharging end, a conveying module is configured to sequentially convey a plurality of overlapped lightweight compounded uni-directional cloths through the heating area and the cooling area, the plurality of lightweight compounded uni-directional cloths are heated and pressed in the heating area, a pressed product is discharged after the lightweight compounded uni-directional cloths are cooled in the cooling area, and the micro-controller is electrically connected to the overlapping and compounding machine, and is configured to control the operating temperature of the heating area.

7. The system for manufacturing the lightweight compounded uni-directional cloth according to claim 6, wherein after the plurality of lightweight compounded uni-directional cloths is heated and pressed in the heating area, yarn layers of the lightweight compounded uni-directional cloths are fused to form a whole body.

8. The system for manufacturing the lightweight compounded uni-directional cloth according to claim 6, wherein two heat-resistant conveying belts clamp the plurality of overlapped lightweight compounded uni-directional cloths in the heating area, and the two heat-resistant conveying belts and the plurality of lightweight compounded uni-directional cloths are tensioned and conveyed through a space between a plurality of heating rollers in a staggered manner, so that the plurality of lightweight compounded uni-directional cloths is pressed and pulled in the conveying process.

9. The system for manufacturing the lightweight compounded uni-directional cloth according to claim 8, wherein the micro-controller controls the operating temperatures of the plurality of heating rollers to decrease from the feeding end to the cooling area.

10. The system for manufacturing the lightweight compounded uni-directional cloth according to claim 8, wherein after leaving away from the heating area, the plurality of pressed lightweight compounded uni-directional cloths is tensioned and conveyed through a space between a plurality of temperature-control rollers in the cooling area in a staggered manner, and the micro-controller controls the operating temperatures of the plurality of temperature-control rollers to decrease from the heating area to the discharging end.

11. The system for manufacturing the lightweight compounded uni-directional cloth according to claim 6, wherein the overlapping and compounding machine has two pressing and feeding modules arranged oppositely, each of the two pressing and feeding modules has a heat-resistant belt surrounding a plurality of rollers, a conveying channel is formed between the two heat-resistant belts, and the rollers, closest to the conveying channel, in the two pressing and feeding modules have an adjustable distance.

\* \* \* \* \*